(12) United States Patent
Arakawa et al.

(10) Patent No.: US 10,360,471 B2
(45) Date of Patent: Jul. 23, 2019

(54) IMAGE RETRIEVING DEVICE, IMAGE RETRIEVING METHOD, AND RECORDING MEDIUM

(71) Applicant: CANON KABUSHIKI KAISHA, Tokyo (JP)

(72) Inventors: Junya Arakawa, Nagareyama (JP); Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/398,834

(22) Filed: Jan. 5, 2017

(65) Prior Publication Data
US 2017/0213103 A1 Jul. 27, 2017

(30) Foreign Application Priority Data

Jan. 27, 2016 (JP) .................. 2016-013680

(51) Int. Cl.
*G06K 9/00* (2006.01)
*G06K 9/46* (2006.01)
(Continued)

(52) U.S. Cl.
CPC .......... *G06K 9/4671* (2013.01); *G06K 9/527* (2013.01); *G06K 9/6202* (2013.01);
(Continued)

(58) Field of Classification Search
USPC ................................ 382/181–231
See application file for complete search history.

(56) References Cited

U.S. PATENT DOCUMENTS

| 6,216,163 | B1 * | 4/2001 | Bharali | ............... G06F 11/1443 709/224 |
| 8,027,514 | B2 | 9/2011 | Takaki et al. | |

(Continued)

FOREIGN PATENT DOCUMENTS

| JP | 4988408 B2 | 8/2012 |
| JP | 2014-134860 A | 7/2014 |

OTHER PUBLICATIONS

Harris, Chris and Mike Stephens, "A Combined Corner and Edge Detector," In Alvey Vision Conference, Plesey Research Roke Manor, United Kingdom, 1988, pp. 147-152.

(Continued)

*Primary Examiner* — Alex Kok S Liew
(74) *Attorney, Agent, or Firm* — Venable LLP

(57) ABSTRACT

An image retrieving device capable of retrieving an image using a local feature quantity, the image retrieving device includes a memory, and a processor in communication with the memory, the processor being configured to perform operations including receiving a designation of a retrieval condition corresponding to a retrieval source image, determining whether to use a feature quantity of a local image having scale invariance on the basis of the retrieval condition, and performing control to calculate the feature quantity of the local image having scale invariance if it is determined to use the feature quantity of the local image having scale invariance, and performing control not to calculate the feature quantity of the local image having scale invariance if it is determined not to use the feature quantity of the local image having scale invariance.

11 Claims, 13 Drawing Sheets

(51) Int. Cl.
    *G06K 9/62* (2006.01)
    *H04N 1/04* (2006.01)
    *G06K 9/52* (2006.01)
(52) U.S. Cl.
    CPC ......... *G06K 9/6212* (2013.01); *G06K 9/6253* (2013.01); *H04N 1/04* (2013.01); *H04N 2201/0094* (2013.01)

(56) References Cited

U.S. PATENT DOCUMENTS

| | | |
|---|---|---|
| 8,259,368 B2 | 9/2012 | Otake |
| 2004/0073543 A1* | 4/2004 | Kim ............... G06F 17/30247 |
| 2008/0152225 A1* | 6/2008 | Iwamoto ............ G06K 9/4642 |
| | | 382/190 |
| 2008/0247651 A1* | 10/2008 | Takaki ............... G06K 9/4671 |
| | | 382/219 |
| 2009/0010558 A1* | 1/2009 | Dekel ............... G06F 17/30247 |
| | | 382/248 |
| 2009/0060259 A1* | 3/2009 | Goncalves ............ A47F 9/047 |
| | | 382/100 |
| 2012/0154853 A1 | 6/2012 | Otake |
| 2014/0193077 A1 | 7/2014 | Shiiyama et al. |
| 2016/0042254 A1 | 2/2016 | Miyauchi et al. |

OTHER PUBLICATIONS

Lowe, David G., "Distinctive Image Features from Scale-Invariant Keypoints," Computer Science Department, University of British Columbia, Vancouver, B.C., Canada, Jan. 5, 2004, pp. 1-28.

* cited by examiner

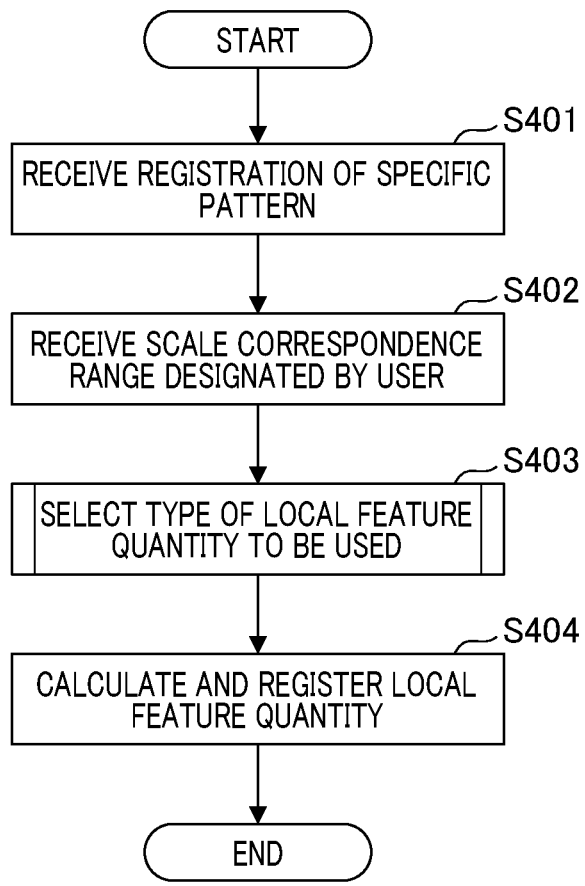

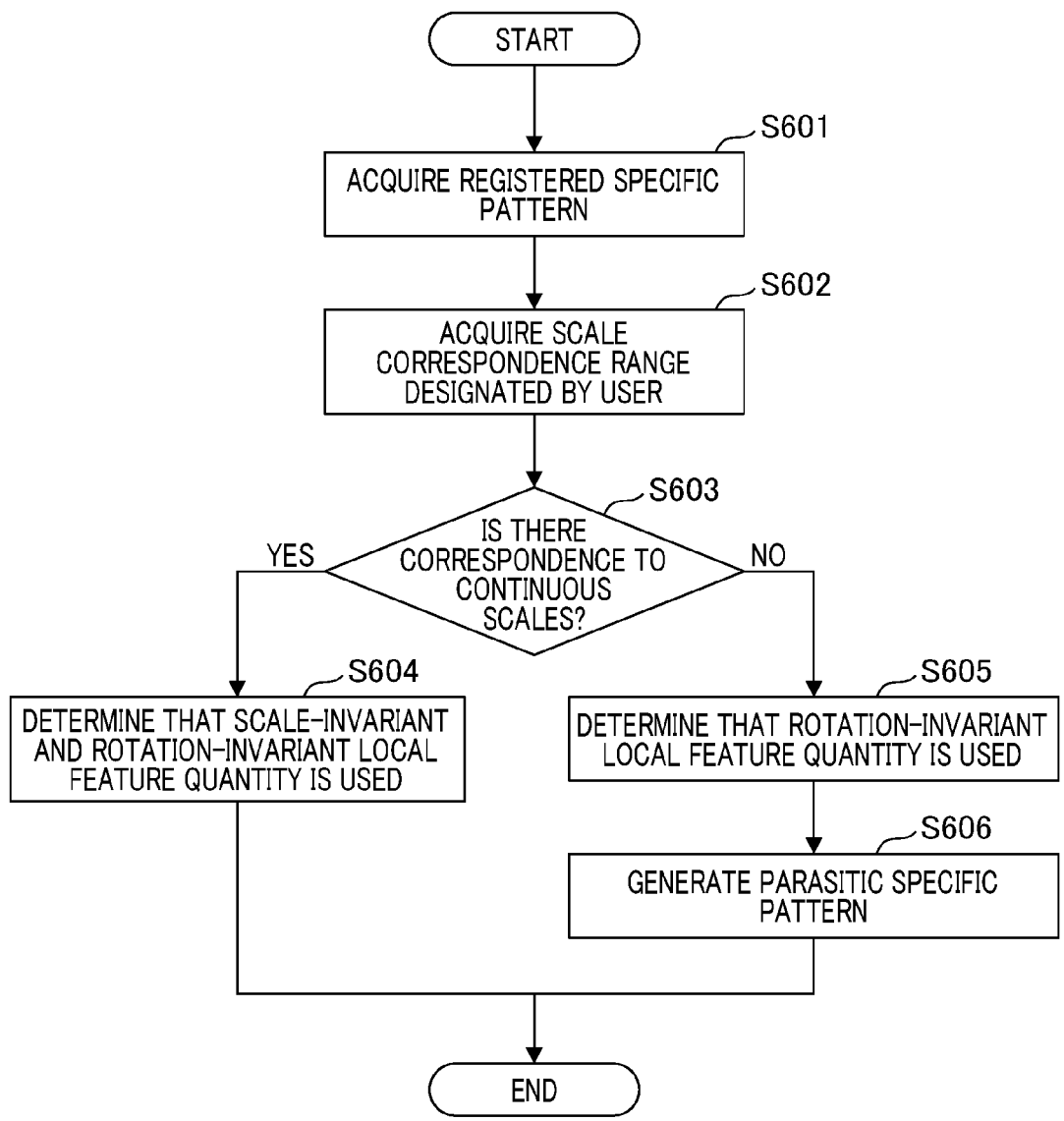

FIG. 10

Estimated local feature quantity extraction time of query image (G)

| | Average local feature point extraction time from query image (A) | Average number of local feature points in query image (B) | Local feature quantity calculation time per point (C) | Total time G=A+B*C |
|---|---|---|---|---|
| Scale-invariant and rotation-invariant local feature quantity | 500 | 2000 | 0.01 | 520 |
| Rotation-invariant local feature quantity | 100 | 2200 | 0.01 | 122 |

Time unit ms

Estimated matching time (H)

| | Total number of feature points in specific pattern/parasitic specific pattern (D) | Average number of local feature points in query image (B) | Local feature quantity matching time per local feature quantity pair (E) | Average calculation time for degree of matching with specific pattern not detected (F) | Total time H=D*B*E+F |
|---|---|---|---|---|---|
| Scale-invariant and rotation-invariant local feature quantity | 3000 | 2000 | 0.00001 | 20 | 80 |
| Rotation-invariant local feature quantity | 8000 | 2200 | 0.00001 | 18 | 194 |

Time unit ms

| | Estimated time G+H |
|---|---|
| Scale-invariant and rotation-invariant local feature quantity | 600 |
| Rotation-invariant local feature quantity | 316 |

Time unit ms

FIG. 11

Estimated local feature quantity extraction time of query image (G)

| | Average extraction time for local feature point from query image (A) | Average number of local feature points in query image (B) | Local feature quantity calculation time per point (C) | Total time G=A+B*C |
|---|---|---|---|---|
| Scale-invariant and rotation-invariant local feature quantity | 500 | 3000 | 0.01 | 530 |
| Rotation-invariant local feature quantity | 100 | 3500 | 0.01 | 135 |

Time unit ms

Estimated matching time (H)

| | Total number of feature points in specific pattern/parasitic specific pattern (D) | Average number of local feature points in query image (B) | Local feature quantity matching time per local feature quantity pair (E) | Average calculation time for degree of matching with specific pattern not detected (F) | Total time H=D*B*E+F |
|---|---|---|---|---|---|
| Scale-invariant and rotation-invariant local feature quantity | 4000 | 3000 | 0.00001 | 20 | 140 |
| Rotation-invariant local feature quantity | 20000 | 3500 | 0.00001 | 18 | 718 |

Time unit ms

| | Estimated time G+H |
|---|---|
| Scale-invariant and rotation-invariant local feature quantity | 670 |
| Rotation-invariant local feature quantity | 853 |

Time unit ms

IMAGE RETRIEVING DEVICE, IMAGE RETRIEVING METHOD, AND RECORDING MEDIUM

CLAIM TO PRIORITY

This application claims the benefit of Japanese Patent Application No. 2016-013680, filed Jan. 27 2016, which is hereby incorporated by reference wherein in its entirety.

BACKGROUND OF THE INVENTION

Field of the Invention

The present invention relates to an image retrieving device, an image retrieving method, and a recording medium.

Description of the Related Art

A method of retrieving a similar image using a local feature quantity of an image has been proposed. In this method, first, a feature point (a local feature point) is extracted from an image (C. Harris and M. J. Stephens, "A combined corner and edge detector," In Alvey Vision Conference, pages 147-152, 1988). Then, a feature quantity (a local feature quantity) corresponding to the local feature point is calculated on the basis of image information of the local feature point and the vicinity thereof (David G. Lowe, "Distinctive Image Features from Scale-Invariant Keypoints," Jan. 5, 2004). Retrieval of an image is performed by matching local feature quantities.

This method of retrieving an image using a feature quantity can be applied to detect that a specific pattern is included in a scanned image or an image rendered from PDL in a multi-functional printer (MFP). First, a local feature quantity is extracted from a specific pattern to be detected (hereafter, referred to as a specific pattern) and registered in the MFP in advance. Then, a local feature quantity is extracted from a document image. Finally, the registered local feature quantity and the local feature quantity extracted from the document image are matched, a degree of matching is calculated, and it is determined that the specific pattern is included in the document image if the degree of matching is equal to or greater than a predetermined value. If the specific pattern is detected, the MFP switches a subsequent process from a normal process. For example, if a specific pattern is detected, the document image is not printed, the document image is not transmitted to the outside, or a manager is notified of the detection.

The time required for detecting a specific pattern is a sum of a calculation time of a local feature quantity and a matching time of local feature quantities. The matching time is proportional to the number of local feature quantity pairs to be matched. Japanese Patent Laid-Open No. 2014-134860 discloses a technique of performing fast matching by limiting local feature quantities to be used among extracted local feature quantities and minimizing a matching time of the local feature quantities.

However, Japanese Patent Laid-Open No. 2014-134860 discloses a technique of fast matching local feature quantities by reducing local feature quantities to be used for the matching, but does not consider a calculation time of the local feature quantities. In order to shorten the time required for detecting a specific pattern, it is also necessary to shorten the calculation time of local feature quantities.

SUMMARY OF THE INVENTION

The present invention provides an image retrieving device that can achieve optimization of a detection time according to a user's use conditions.

According to one aspect, the present invention provides an image retrieving device capable of retrieving an image using a local feature quantity, the image retrieving device including: an input unit configured to input an image, a reception unit configured to receive designation of a retrieval condition corresponding to a retrieval source image, a selection unit configured to select a retrieval method on the basis of the retrieval condition, a calculation unit configured to calculate a local feature quantity of an image on the basis of the selected retrieval method, and a comparison unit configured to compare a local feature quantity of a retrieval target image with a local feature quantity of the retrieval source image.

Further features of the present invention will become apparent from the following description of exemplary embodiments with reference to the attached drawings.

BRIEF DESCRIPTION OF THE DRAWINGS

FIG. 4 is a diagram illustrating a specific pattern registering flow in the present invention.

FIG. 6 is a diagram illustrating a local feature quantity selecting flow according to a first embodiment of the present invention.

FIG. 10 is a diagram illustrating an example of an estimated detection time.

FIG. 11 is a diagram illustrating an example of an estimated detection time.

DESCRIPTION OF THE EMBODIMENTS

First Embodiment

Figure 1:
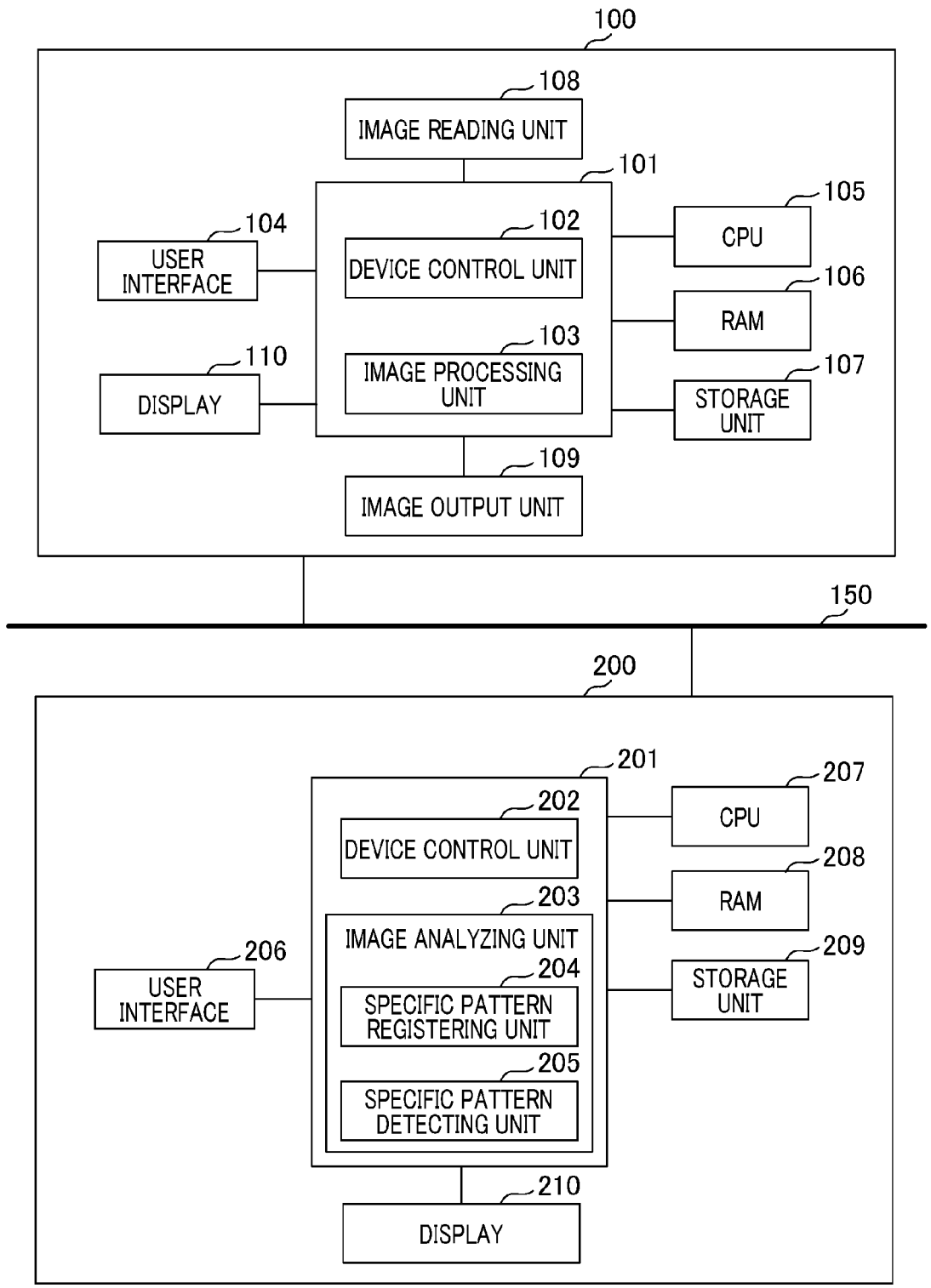
FIG. 1 is a block diagram illustrating an example of a hardware configuration according to an embodiment of the present invention.

FIG. 1 is a block diagram illustrating an example of a system configuration of a first embodiment of the present invention. As illustrated in FIG. 1, an image retrieval system according to this embodiment includes an image processing device 100 and an image retrieving device 200, and the image processing device 100 and the image retrieving device 200 are connected to each other to transmit and receive data therebetween via a network 150.

The image processing device 100 includes a user interface 104, a CPU 105, a RAM 106, a storage unit 107, an image reading unit 108, an image output unit 109, and a display 110, which are connected to each other to communicate with each other via a control unit 101. The control unit 101 further includes a device control unit 102 that controls the image processing device 100 as a whole and an image processing unit 103 that processes image data.

The user interface 104 includes, for example, a keyboard, a mouse, or other input and output devices, and various set values or designated values can be input via the user interface.

The CPU 105 reads a main program from the storage unit 107 in accordance with an initial program in the storage unit 107 and stores the read main program in the RAM 106.

The RAM 106 is used to store a program or is used as a main memory for work.

The image reading unit 108 includes, for example, a scanner, and can acquire a document image in an image data format by reading a paper document.

When a document image is acquired from the image reading unit 108, the control unit 101 stores the document image in the storage unit 107. Then, the control unit 101 transmits the document image stored in the storage unit 107 to the image retrieving device 200 via the network 150 when performing a specific pattern registering process or a specific pattern detecting process. The control unit 101 also provides the document image stored in the storage unit 107 to the display 110 and performs a process of outputting the document image onto the display 110. Similarly, the control unit 101 provides the document image stored in the storage unit 107 to the image output unit 109.

The image output unit 109 performs a process of outputting the document image in various formats. For example, the image output unit 109 can perform a process of outputting image data relevant to the document image to a storage medium. The image output unit 109 may have a printing function and perform a process of outputting the document image to an output medium such as a paper medium.

The above-mentioned image processing device 100 is only an example and the image processing device 100 may have a configuration not including the image reading unit 108 or the image output unit 109.

The image retrieving device 200 includes a user interface 206, a CPU 207, a RAM 208, a storage unit 209, and a display 210, which are connected to each other to communicate with each other via a control unit 201. The control unit 201 includes a device control unit 202 that controls the image retrieving device 200 as a whole and an image analyzing unit 203 that analyzes an image. The image analyzing unit 203 includes a specific pattern registering unit 204 that performs a specific pattern registering process and a specific pattern detecting unit 205 that detects a specific pattern.

The user interface 206 includes, for example, a keyboard, a mouse, or other input and output devices, and various set values or designated values can be input via the user interface. The user interface 206 in this embodiment functions as a specific pattern registration receiving unit and a correspondence scale designation receiving unit to be described later.

The CPU 207 reads a main program from the storage unit 209 in accordance with an initial program in the storage unit 209 and stores the read main program in the RAM 208. The RAM 208 is used to store a program or is used as a main memory for work.

The control unit 201 provides a document image stored in the storage unit 209 to the display 210 and performs a process of outputting the document image onto the display 210. The control unit 201 provides the image analyzing unit 203 with the document image stored in the storage unit 209 of the image retrieving device 200.

The image analyzing unit 203 performs a process of detecting a specific pattern in the document image on the basis of various types of designation information received via the user interface 206. Various types of designation information received via the user interface 206 are stored in the storage unit 209 or the RAM 208, and the image analyzing unit 203 performs a process of reading the stored designation information and detecting a specific pattern in the document image. The image analyzing unit 203 also performs a specific pattern registering process.

In a specific pattern registration phase, the image analyzing unit 203 in this embodiment determines a local feature quantity to be used using a method to be described later, calculates a local feature quantity in a specific pattern image, and stores the calculated local feature quantity in the storage unit 209 or the RAM 208. In a specific pattern detection phase, the image analyzing unit 203 in this embodiment calculates a local feature quantity from the document image. Then, the image analyzing unit 203 matches the calculated local feature quantity with the local feature quantity stored in the storage unit 209 or the RAM 208 in the specific pattern registration phase, calculates a degree of matching, and determines whether a specific pattern is present.

The above-mentioned image retrieving device 200 is only an example and this embodiment is not limited to this configuration. The image retrieving device 200 may have other configurations if necessary. For example, the image retrieving device 200 can be mounted on a computer device such as a server, or the function of the storage unit 209 or the image analyzing unit 203 may be implemented by a remote computational resource which is called a cloud and connected via the network 150. The image processing device 100 may have the image retrieving device 200 mounted thereon in an aspect in which the image processing device 100 has the function of the image retrieving device 200.

Some of local feature quantities which are feature points of an image may have rotation invariance in which a similar local feature quantity can also be extracted from a rotated image or scale invariance in which a similar local feature quantity can also be extracted from a scaled image. Even when a specific pattern included in a document image is rotated or scaled, the specific pattern can be detected using such local feature quantities. However, since calculation of a local feature quantity having scale invariance requires calculation of a scale space which is a set of images with different scales and extraction of an optimal local feature point from the scale space, a calculation load thereof increases. Accordingly, it may take time to calculate a local feature quantity having rotation invariance and scale invariance. On the other hand, if the specific pattern has only a predetermined size, a local feature quantity not having scale invariance and having only rotation invariance can be used to reduce the time required for calculating the local feature quantity and to faster detect the specific pattern. Accordingly, there are a case in which use of a local feature quantity having rotation invariance and scale invariance as a local feature quantity is significant for retrieval and a case in which use of a local feature quantity not having scale invariance but having rotation invariance as a local feature quantity is significant for retrieval. In the present invention, a local feature quantity significant for retrieval can be selected.

A method of calculating a local feature quantity not having scale invariance but having only rotation invariance (a rotation-invariant local feature quantity) will first be described below and a method of calculating a local feature quantity having rotation invariance and scale invariance (a scale-invariant and rotation-invariant local feature quantity) will then be described.

First, the method of calculating a local feature quantity not having scale invariance but having only rotation invariance (a rotation-invariant local feature quantity) will be described below. In order to calculate a local feature quantity from an image, the image analyzing unit 203 extracts a luminance component from the image and generates a luminance component image on the basis of the extracted luminance component. Local feature points which can be extracted in a robust manner irrespective of rotation of the image are extracted from the luminance component image. A Harris operator which is known is used in the method of extracting local feature points in the first embodiment. Specifically, for each pixel on an output image H which is acquired by applying the Harris operator thereto, pixel values of the pixel and eight pixels adjacent to the pixel (total nine pixels) are inspected. A point at which a pixel is locally a maximum (the pixel value of the pixel among the nine pixels is a maximum) is extracted as a local feature point. Here, when the pixel has locally a maximum but the pixel value of the pixel is equal to or less than a threshold value, the point of the pixel is not extracted as the local feature point. A local feature point extracting method is not limited to the feature point extracting method using the Harris operator, and any feature point extracting method can be used as long as it can extract a local feature point.

Subsequently, for each extracted local feature point, a feature quantity (a local feature quantity) which is defined to be invariant with rotation of an image is calculated. A scale-invariant feature transform (SIFT) method which is a known method is used as a method of calculating the local feature quantity in the first embodiment, the SIFT method being a technique of calculating a histogram of edges around the local feature point, setting an edge direction in which the histogram frequency is the largest as a "reference direction," and normalizing and describing the feature quantity in the direction. The SIFT method is widely used to recognize an object so as to describe a feature quantity of the detected feature point which is robust to rotation of an image, a variation in scale, an illumination variation, and the like. Even when the local feature point rotates, the same feature quantity can be calculated due to the reference direction and thus is a feature quantity having rotation invariance.

The rotation-invariant local feature quantity does not have scale invariance, but can have correspondence to a scaled specific pattern by generating and storing a parasitic specific pattern from the specific pattern registered by a user. Here, the parasitic specific pattern is a pattern which is generated by scaling the specific pattern to cope with a specific pattern with another scale. For example, if the user requests to detect specific patterns with scales of 50%, equal magnification, and 150%, a pattern of an equal magnification registered by the user is changed in magnification to generate parasitic specific patterns with sizes of 50% and 150%. By extracting the local feature quantity from the parasitic specific patterns and using the extracted local feature quantities for matching, it is possible to detect a specific pattern with a scale of 50% or 150%. A method of calculating a rotation-invariant local feature quantity is not limited to the above-mentioned feature quantity calculating method, and any feature quantity calculating method can be used as long as it can calculate a rotation-invariant local feature quantity.

Next, the method of calculating a local feature quantity having scale invariance and rotation invariance (a scale-invariant and rotation-invariant local feature quantity) will be described below.

In order to calculate a local feature quantity from an image, as described above, the image analyzing unit 203 extracts a luminance component from the image and generates a luminance component image on the basis of the extracted luminance component.

Then a reduced image generating process is performed to generate a scale space which is a set of images with different scales. Specifically, n reduced images are generated which are gradually reduced from the image with an original size by repeatedly performing sequential reduction of the luminance component image based on magnifications (reduction ratios) p n times. Here, it is assumed that the magnification p and the number of reduced images n are determined in advance.

Figure 2:
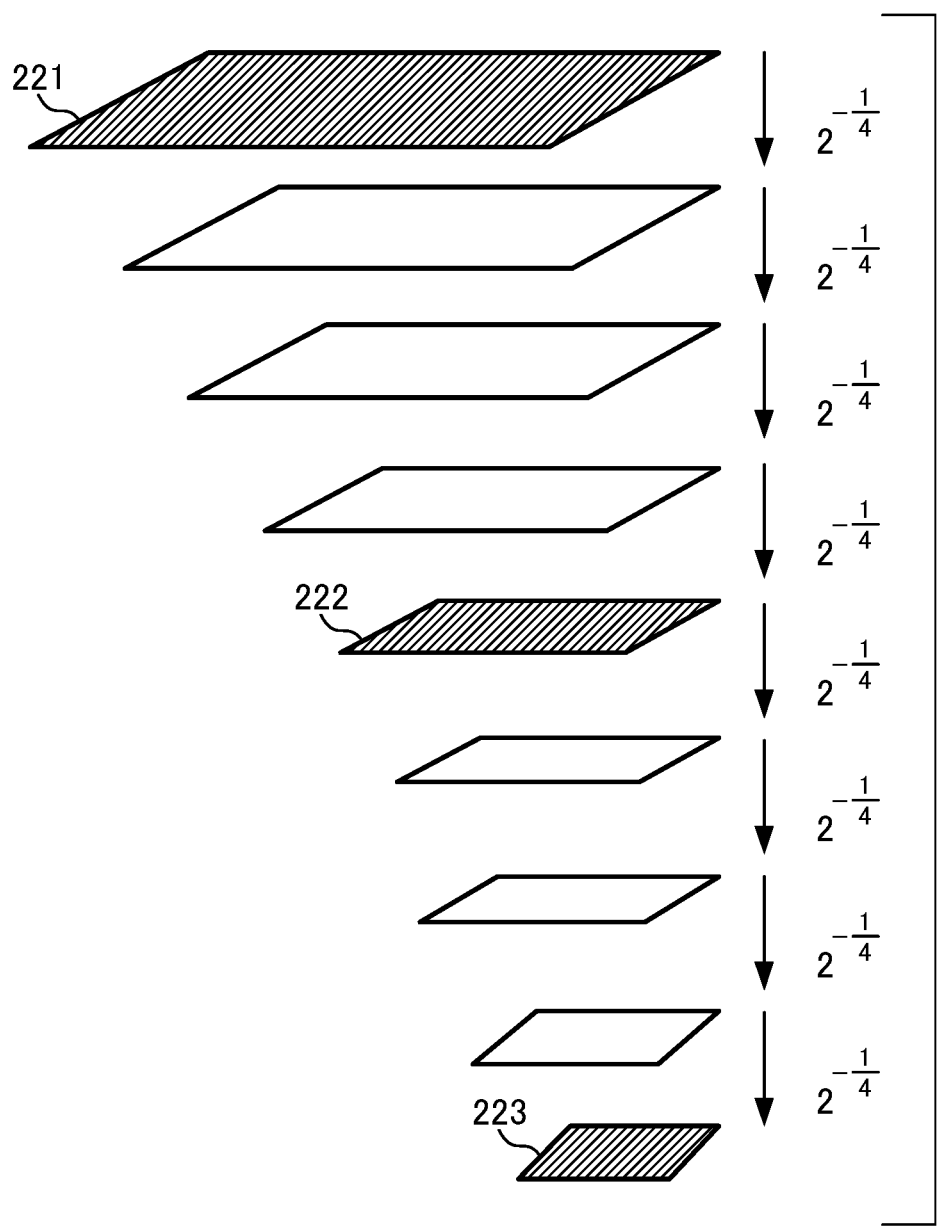
FIG. 2 is a diagram illustrating a concept of a scale space.

FIG. 2 is a diagram illustrating an example of the reduced image generating process. In the example illustrated in FIG. 2, the magnification p is "−(¼) power of 2," the number of reduced images n is "8," and the number of images including the original image n+1 is "9." The magnification p may not be "−(¼) power of 2." A luminance component image 221 is a luminance component image which is generated on the basis of a luminance component which is extracted from the image. A reduced image 222 is a reduced image which is acquired by recursively performing a reduction process on the luminance component image 221 with the magnification p four times. A reduced image 223 is a reduced image which is acquired by performing the reduction process on the luminance component image 221 with the magnification p eight times.

In this example, the reduced image 222 is an image which is obtained by reducing the luminance component image 221 to a half, and the reduced image 223 is an image which is obtained by reducing the luminance component image 221 to a quarter. As the method of reducing an image, a reduction method using linear interpolation and a reduction method of simulatively lowering a resolution by gradating an image using a Gaussian filter are combined in the first embodiment. This method is a technique for a known SIFT feature quantity. Reduction of an image may be performed using other methods.

When the scale space is generated, a local feature point which is robustly extracted irrespective of scaling and rotation of an image is extracted from the scale space. As this method of extracting a local feature point, the SIFT method which is a known method is used in the first embodiment. Specifically, first, difference images between neighboring reduced images in the scale space are prepared. In the example illustrated in FIG. 2, eight difference images (D1 to D8) are generated from one original image and eight reduced images. A point at which a pixel is locally a maximum between one difference image DK and neighboring difference images (between the difference image D(K−1) and the difference image DK and between the difference image DK and the difference image D(K+1)) is extracted as the local feature point. Here, K ranges from 2 to 7. Neighboring pixels within a range of a local area are eight neighboring pixels of a pixel in the difference image DK. A pixel corresponding to the pixel and eight neighboring pixels thereof in the difference image larger by one level (the difference image D(K+1)) and a pixel corresponding to the pixel and eight neighboring pixels thereof in the difference image smaller by one level (the difference image D(K−1)) are neighboring pixels. These 26 pixels in total are neighboring pixels. The extracted point is a point in which a contrast variation has an extreme value in the scale direction and is a feature point having scale invariance.

Figure 3A:
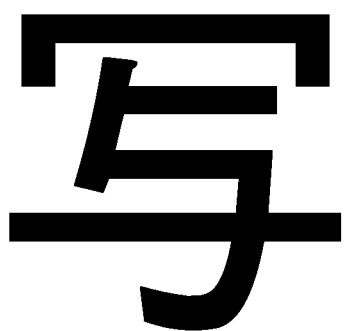
FIGS. 3A to 3C are diagrams illustrating a concept of scale invariance.
Figure 3B:
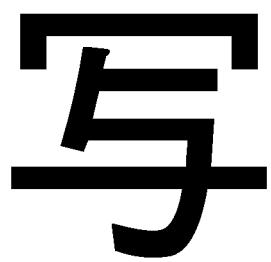
Figure 3C:
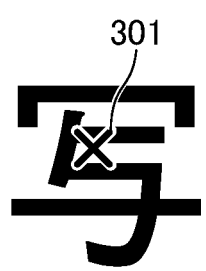

FIGS. 3A to 3C are diagrams illustrating the concept of scale invariance. For example, in images having the same shape and having different scales as illustrated in FIGS. 3A to 3C, positions from which the feature point of the luminance component image is extracted is the same and is a point of an x mark 301 in FIG. 3C.

Subsequently, for each of the extracted local feature points, a feature quantity (a local feature quantity) which is defined to be invariant with rotation of the image is calculated in the reduced image with the scale from which the feature point is extracted.

This local feature quantity calculating method is the same as the above-mentioned local feature quantity calculating method and description thereof will not be repeated.

Through the above-mentioned method, the scale-invariant and rotation-invariant local feature quantity can be calculated, but the calculation time thereof may increase several to several tens of times greater than the calculation time of the rotation-invariant local feature quantity due to calculation of the scale space and the area of a feature search range depending on the method. That is, the scale-invariant and rotation-invariant local feature quantity exhibits high performance, but causes a decrease in productivity due to an increase in the calculation time. Accordingly, it is not necessarily preferable to use the scale-invariant and rotation-invariant local feature quantity. The area of the search range includes factors of two types of the area of the scale space and the area of the neighboring area (nine pixels become 26 pixels in this embodiment).

Figure 5:
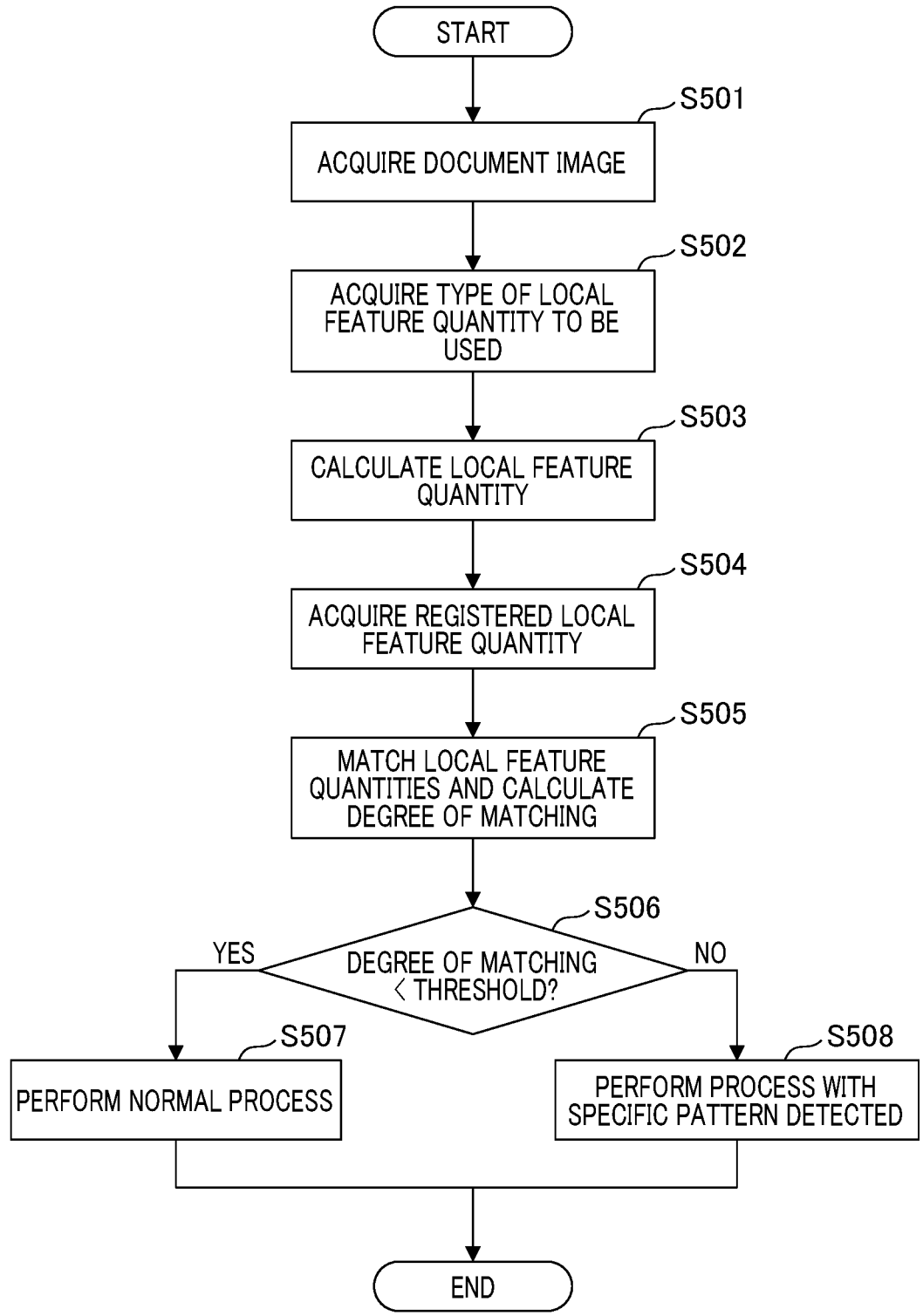
FIG. 5 is a diagram illustrating a specific pattern detecting flow in the present invention.

The whole flow in this embodiment will be described below with reference to FIGS. 4 and 5. FIG. 4 is a flowchart illustrating a specific pattern (retrieval source image) registering process in the image retrieving device 200. The flow illustrated in FIG. 4 is started when a user inputs a specific pattern registration instruction to the user interface 206. FIG. 5 is a flowchart illustrating a specific pattern detecting process in the image retrieving device 200. The flow illustrated in FIG. 5 is started when a document image is transmitted from the image processing device 100 to the image retrieving device 200. The processes of the flowcharts illustrated in FIGS. 4 and 5 are performed by loading a program code stored in the storage unit 209 into the RAM 208 and causing the CPU 207 to execute the program code.

In S401 of FIG. 4, the specific pattern registering unit 204 of the image analyzing unit 203 receives registration of a specific pattern image from the user via the user interface 206. Here, examples of the specific pattern include a company log, a pattern indicating a sentence having high confidentiality such as "Confidential," a sentence having high confidentiality such as a back side of a personal ID card of which copying is prohibited, a new product logo, and a new product design. Registration of a specific pattern is performed by displaying an image stored in the storage unit 209 or an image stored in the storage unit 107 of the image processing device 100 on the display 210 and allowing a user to designate a specific pattern in the displayed image. The image stored in the storage unit 107 is acquired from the image processing device 100 via the network 150 using a known technique such as SMB. If the specific pattern to be registered is not present in the display image, the user appropriately adds an image to the storage unit 107 or the storage unit 209. For example, in the image processing device 100, an original document having the specific pattern to be registered is read by the image reading unit 108 and is stored in the storage unit 107. After designation of the specific pattern from the user is received, the new specific pattern image with a predetermined resolution is stored in the storage unit 209. At this time, a blank part in the image is removed and only the image of a part having the pattern is stored. If the specific pattern which the user wants to register is only a part of the image, the image designated by the user is displayed on the display 210, an instruction of an area to be actually registered is received via the user interface 206, and only the area is stored in the storage unit 209.

Figure 7A:
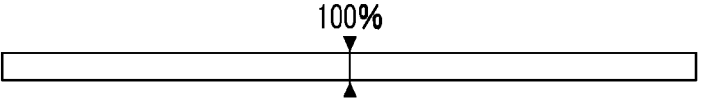
FIGS. 7A to 7C are diagrams illustrating a UI for designating scale correspondence of a specific pattern.

Then, in S402, the specific pattern registering unit 204 of the image analyzing unit 203 receives a scale correspondence range of the specific pattern which is newly registered via the user interface 206. The scale correspondence range is one of retrieval conditions. For example, a screen illustrated in FIG. 7A is displayed on the display 210, and designation of a scale range from which the pattern newly registered by the user needs to be detected is received.

Figure 7B:
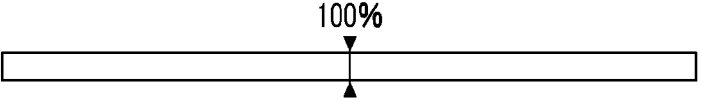
Figure 7C:
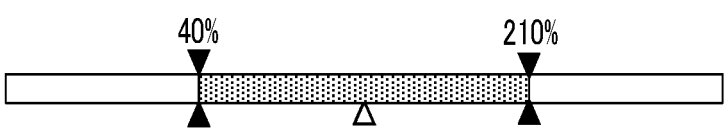

The designation method includes two types of discrete scale designation in which only specific patterns with discrete scales are used as a detection target and continuous scale designation in which specific patterns with continuous scales are designated. For example, FIG. 7B illustrates a display example of the display 210 when the user performs the discrete scale designation via the user interface 206. In this example, the specific pattern registering unit 204 receives detection of specific patterns with scales of an equal magnification, 71%, and 141%. FIG. 7C illustrates a display example of the display 210 when the user performs the continuous scale designation via the user interface 206. In this example, the specific pattern registering unit 204 receives detection of specific patterns with scales of 40% to 210%. The specific pattern registering unit 204 stores the received scale correspondence range in correlation with the specific pattern in the storage unit 209.

Then, in S403, the specific pattern registering unit 204 of the image analyzing unit 203 selects the type of the local feature quantity to be used using information of the registered specific pattern. The selected type of the local feature quantity is stored in the storage unit 209. When a parasitic specific pattern image (a parasitic image) with a scale difference from the specific pattern image stored in the storage unit 209 in Step S401 is required, the pattern is generated and is also stored in the storage unit 209.

Now, details of the process of S403 will be described with reference to FIG. 6. FIG. 6 is a flowchart illustrating a flow of selecting a local feature quantity in the first embodiment. The processes of the flowchart illustrated in FIG. 6 are performed by loading a program code stored in the storage unit 209 into the RAM 208 and causing the CPU 207 to execute the program code.

First, in S601 of FIG. 6, the specific pattern registering unit 204 of the image analyzing unit 203 acquires the specific pattern registered in the storage unit 209.

Then, in S602, the specific pattern registering unit 204 of the image analyzing unit 203 acquires the scale correspondence range correlated with the specific pattern from the storage unit 209. The scale correspondence range is stored in S402.

Subsequently, in S603, the specific pattern registering unit 204 of the image analyzing unit 203 determines whether continuous scale correspondence is included in the scale correspondence range acquired in S602. If the continuous scale correspondence is included in the scale correspondence range, the process of S604 is performed. If the continuous scale correspondence is not included in the scale correspondence range, the process of S605 is performed.

The reason why this divergence is performed will be described below. First, the time required to detect the specific pattern from a query image can be expressed by Expression 1. Expression 2 represents a time for matching with the specific pattern.

Detection time=local feature quantity detection time from query image+matching time with specific pattern  (Expression 1)

Matching time with specific pattern=(number of specific patterns+number of parasitic specific patterns)×matching time per specific pattern  (Expression 2)

If the scale-invariant and rotation-invariant local feature quantity is used, the local feature quantity detection time is extended but the matching time is shortened because the parasitic specific pattern for scale correspondence is not necessary. When the rotation-invariant local feature quantity is used, the local feature quantity detection time is shortened but the matching time is extended because the parasitic specific pattern for scale correspondence is necessary. In general, this can be expressed by Expression 3.

(Scale-invariant and rotation-invariant local feature quantity calculation time-rotation-invariant local feature quantity calculation time)>>matching time per specific pattern  (Expression 3)

Accordingly, if the number of parasitic specific patterns required is excessively large, the detection time is shortened by using the rotation-invariant local feature quantity. Accordingly, if only the discrete scale correspondence is necessary and the number of parasitic specific patterns required is limited, it is preferable to use the rotation-invariant local feature quantity. Therefore, the scale-invariant and rotation-invariant local feature quantity is used if the continuous scale correspondence is necessary, and the rotation-invariant local feature quantity is used otherwise.

In S604, the specific pattern registering unit 204 of the image analyzing unit 203 determines the scale-invariant and rotation-invariant local feature quantity as the local feature quantity and stores information thereof in the storage unit 209.

In S605, the specific pattern registering unit 204 of the image analyzing unit 203 determines that the rotation-invariant local feature quantity is used as the local feature quantity and stores information thereof in the storage unit 209. Subsequently, in S606, the specific pattern registering unit 204 of the image analyzing unit 203 generates a parasitic specific pattern. For each specific pattern, the parasitic specific pattern is generated on the basis of the correlated scale correspondence range as described above. If an image corresponding to the scale is present in the storage unit 209, the image is registered as an effective parasitic specific pattern and a new image is not generated.

Through the above-mentioned flow, it is possible to select the local feature quantity.

Description with reference to FIG. 4 will be made below again. In S404, the specific pattern registering unit 204 of the image analyzing unit 203 calculates a local feature quantity of the specific pattern stored in the storage unit 209 in S401 using the local feature quantity selected in S402. The calculated local feature quantity is stored in the storage unit 209. If the rotation-invariant local feature quantity is selected as the local feature quantity in S403 and there is a parasitic specific pattern of the specific pattern, the local feature quantity is calculated from the parasitic specific pattern and is stored in the storage unit 209. In order to prevent a delay due to an access to the storage unit 209 at the time of detecting the specific pattern, the local feature quantity may be stored in the RAM 208 in advance. If the type of the local feature quantity selected in S403 is different from the type of the local feature quantity of the specific pattern stored in the storage unit 209 in advance, and the local feature quantity is newly calculated from the registered specific pattern and the parasitic specific pattern and is stored in the storage unit 209. The previously calculated local feature quantity may be selected again in S403 in the next specific pattern registration flow and thus is not deleted but retained if the capacity of the storage unit 209 has room.

Through the above-mentioned flow, the specific pattern registering process can be performed.

The flow of the specific pattern detecting process illustrated in FIG. 5 will be described below. In S501 of FIG. 5, the control unit 201 provides the image analyzing unit 203 with the document image as a retrieval target image which is transmitted from the image processing device 100 and stored in the storage unit 209 of the image retrieving device 200. The document image may be an image read by the image reading unit 108 of the image processing device 100 or may be an image generated by causing the image processing unit 103 to render PDL data having been acquired via the network 150 by the image processing device 100. The acquired image is referred to as a query image.

In S502, the specific pattern detecting unit 205 of the image analyzing unit 203 acquires the type of the local feature quantity to be used for detection from the storage unit 107.

In S503, the specific pattern detecting unit 205 of the image analyzing unit 203 calculates a local feature quantity corresponding to the type of the local feature quantity acquired in S502 from the query image acquired in S501. Here, the calculated feature quantity is referred to as a query local feature quantity. Information on the calculated total number of local feature points is stored in the storage unit 209.

Then, in S504, the specific pattern detecting unit 205 of the image analyzing unit 203 acquires the local feature quantities of the specific pattern group stored in the storage unit 209 or the RAM 208. If there is a parasitic specific pattern group, the local feature quantities thereof are also acquired. Here, the acquired local feature quantity is referred to as a registered local feature quantity.

In S505, the specific pattern detecting unit 205 of the image analyzing unit 203 performs a process of matching the local feature quantity acquired in S504 with the query local feature quantity calculated in S503.

As the matching process, a round-robin matching process of the query local feature quantity and the registered local feature quantity is performed. The matching is performed by calculating a distance between the local feature quantities. If the local feature quantity is a two-value vector (for example, a vector of 128 bits of 128 dimensions), a Hamming distance, or a multi-value vector (for example, a vector of 128 bytes of 128 dimensions), a Euclidean distance is used to calculate the distance. When the number of query local feature quantities or the number of registered local feature quantities increases to perform the round-robin matching process, the matching time increases.

After the distance is calculated, a local feature quantity pair group in which the calculated distance is equal to or less than a predetermined threshold value is extracted. The extracted local feature quantity pair groups are divided by specific patterns or parasitic specific patterns, and a degree of matching for each separate pair group is calculated using a known method. For example, a geometrical relationship in matching the local feature quantity pair group between the query image and a specific pattern R is analyzed, and if there is an area including a common geometrical relationship, the degree of matching with the specific pattern R is increased. A method disclosed in Japanese Patent No. 4988408 can be used as the method of considering the geometrical relationship. The method disclosed in Japanese Patent No. 4988408 is based on the premise of a scale-invariant and rotation-invariant local feature quantity, but can be applied to a rotation-invariant local feature quantity. In this way, the degree of matching of each specific pattern or each parasitic specific pattern with the query image is calculated.

The above-mentioned matching method and matching degree calculating method are only examples and various known matching methods and matching degree calculating methods may be used. For example, instead of the round-robin matching, registered local feature quantities may be indexed in advance and the matching may be performed using the indices.

Then, in S506, the specific pattern detecting unit 205 of the image analyzing unit 203 performs threshold determination using the degree of matching of each specific pattern or parasitic specific pattern with the query image calculated in S504. If all the degrees of matching are equal to or less than a predetermined threshold value, it is determined that a specific pattern is not detected and the process of S507 is performed. If any one of the calculated degrees of matching is greater than the predetermined threshold value, it is determined that a specific pattern is detected and the process of S508 is performed.

In S507, the specific pattern detecting unit 205 of the image analyzing unit 203 performs a normal process. The normal process is to transmit a notification indicating that there is no specific pattern to the image processing device 100 via the network 150. The image processing device 100 having received the notification performs the normal process such as outputting the document image stored in the storage unit 107 and corresponding to the query image to the image output unit 109.

In S508, the specific pattern detecting unit 205 of the image analyzing unit 203 performs a process with a specific pattern detected. The process with a specific pattern detected is to transmit a notification indicating that there is a specific pattern and information on the specific pattern or parasitic specific pattern in which the degree of matching is greater than the predetermined threshold value in S507 to the image processing device 100 via the network 150. The image processing device 100 having received the notification performs the process with a specific pattern detected such as stopping outputting of the document image stored in the storage unit 107 and corresponding to the query image to the image output unit 109. The notification may be transmitted to a manager of the MFP via the network 150 in addition to the image processing device 100.

Through the above-mentioned flow, the specific pattern detecting process can be performed.

As described above, in the specific pattern detecting method which is performed by the image retrieving device 200 according to this embodiment, even when a user requests correspondence to specific patterns with different scales, the local feature quantity to be used is selected depending on the scale correspondence condition. By selecting whether to use the rotation-invariant local feature quantity or the scale-invariant and rotation-invariant local feature quantity depending on the scale correspondence condition, it is possible to achieve optimization of the detection time and to achieve improvement in productivity according to a user's use conditions.

Second Embodiment

Figure 8:
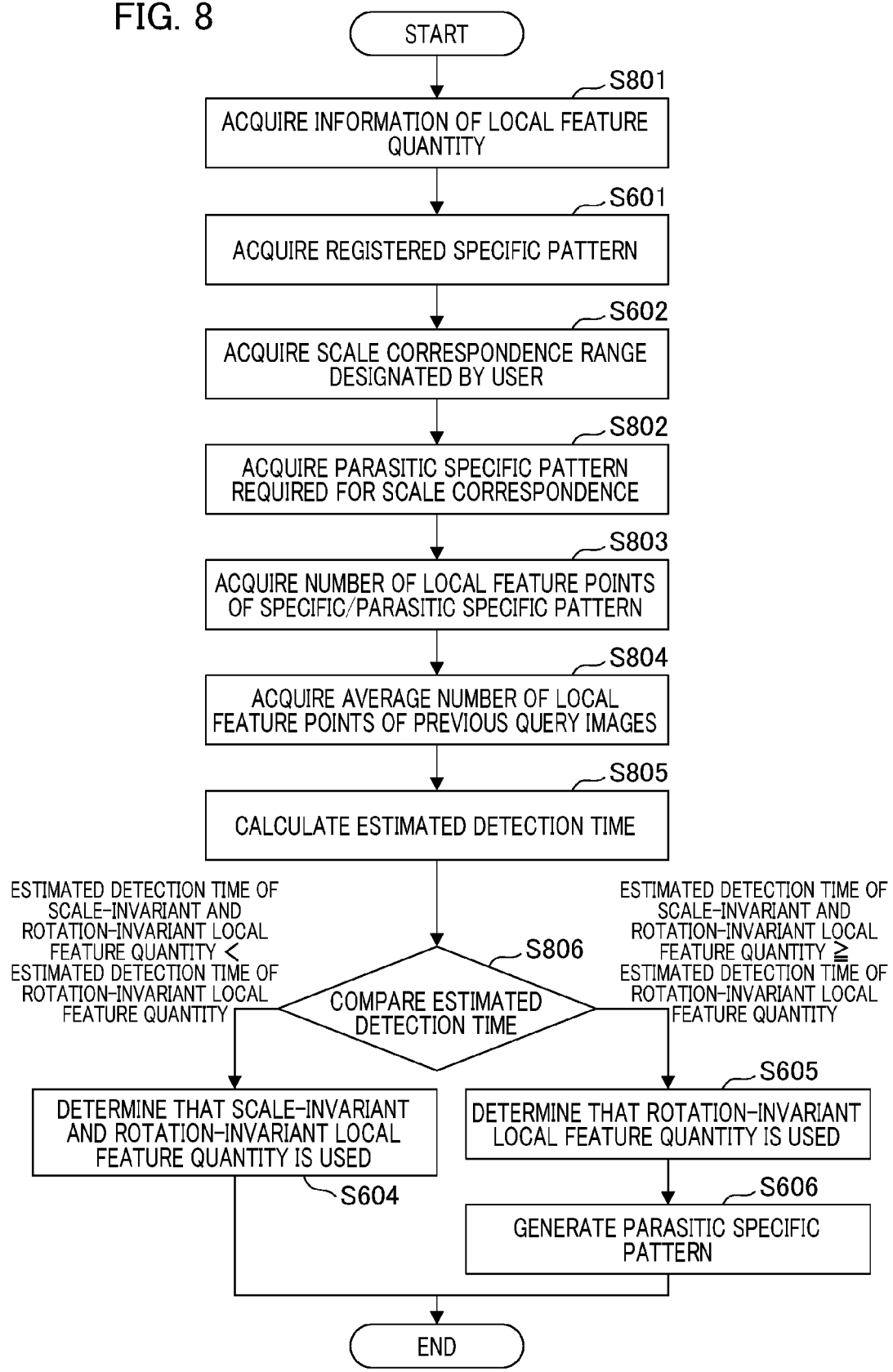
FIG. 8 is a diagram illustrating a local feature quantity selecting flow according to a second embodiment of the present invention.

A second embodiment of the present invention will be described below with a focus on differences from the above-mentioned first embodiment. A first difference from the first embodiment is a detailed flow of S403, which will be described with reference to FIG. 8. FIG. 8 is a diagram illustrating a local feature quantity selecting flow according to the second embodiment. The processes of the flowchart illustrated in FIG. 8 are performed by loading a program code stored in the storage unit 209 into the RAM 208 and causing the CPU 207 to execute the program code.

First, in S801 of FIG. 8, the specific pattern registering unit 204 of the image analyzing unit 203 acquires information of local feature quantities available from the storage unit 209. The acquired information is, for example, the following information for each local feature quantity available. The acquired information is not limited thereto.

An average extraction time of a local feature quantity from a query image

A calculation time of a local feature quantity per point

A matching time of each local feature quantity pair

An average matching degree calculation time when no specific pattern is detected The average extraction time of a local feature quantity from a query image is an average time required for detecting a local feature point in an image size to be detected. As described above, the detection time of a scale-invariant and rotation-invariant local feature quantity is greater by several to several tens of times than that of a rotation-invariant local feature quantity. Since the time required for searching the query image is dominant in the detection time and the detection time does not depend greatly on details of the query image, the detection time can be stored in the storage unit 209 in advance. If the detection time is greatly changed depending on details of the query image for the purpose of an increase in speed, the value stored in the storage unit 209 can be dynamically rewritten with a measured value.

The local feature quantity calculation time per point is a time required for calculating a local feature quantity for an extracted feature point. When a local feature quantity describer which is used to calculate the local feature quantity is common, the calculation time has the same value in the scale-invariant and rotation-invariant local feature quantity and the rotation-invariant local feature quantity.

The matching time per local feature quantity pair is a time required for matching a local feature quantity pair of the query image and the specific pattern or parasitic specific pattern and calculating a matching distance. The matching time depends on the number of dimensions of the local feature quantity, the number of bits per dimension of the local feature quantity, and definition of a distance used for matching.

The average matching degree calculation time when a specific pattern is not detected is an average time required for calculating the degree of matching when a specific pattern is not present in the query image. The average matching degree calculation time has a similar value in local feature quantities having similar degrees of erroneous matching of local feature quantities.

In the case of the rotation-invariant local feature quantity, an accuracy profile when the scale varies is acquired in advance and the accuracy profile will be described later.

S601 and S602 of FIG. 8 are the same as S601 and S602 of FIG. 6 and description thereof will not be repeated.

Figure 9A:
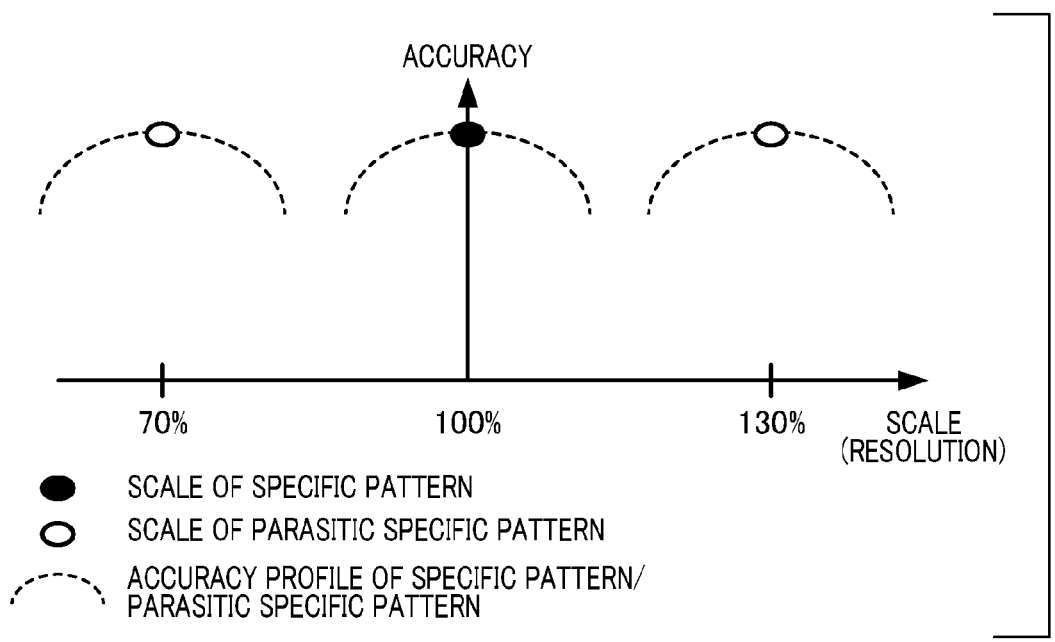
FIGS. 9A and 9B are diagrams illustrating a concept in which scale correspondence is performed using a rotation-invariant local feature quantity.
Figure 9B:
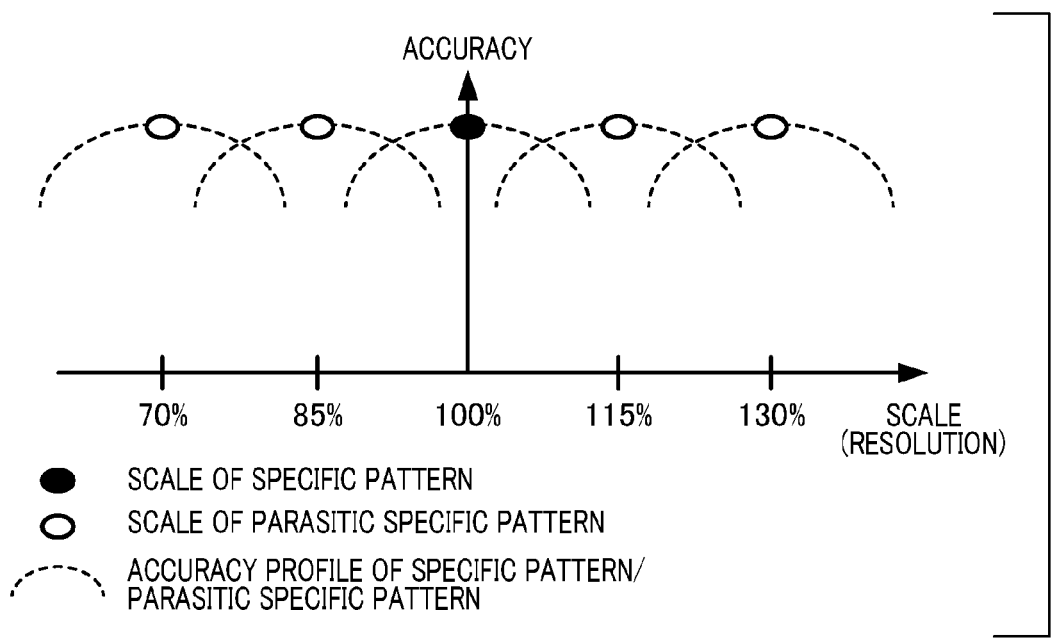

Then, in S802, the specific pattern registering unit 204 of the image analyzing unit 203 acquires a parasitic specific pattern required for scale correspondence. For each specific pattern, a parasitic specific pattern group required in the case in which the scale correspondence range correlated with the specific pattern is set to correspond to the rotation-invariant local feature quantity is generated. The first embodiment is based on the premise that the continuous scale correspondence is not set to correspond to the rotation-invariant local feature quantity, but the continuous scale correspondence is set to correspond to the rotation-invariant local feature quantity in the second embodiment. The rotation-invariant local feature quantity does not have scale invariance, and does not correspond to only a predetermined scale but accuracy thereof gradually decreases with a change of the scale. Here, accuracy refers to how similar local feature quantity is acquired from an image with another scale. Accordingly, it is possible to achieve continuous scale correspondence by generating a plurality of parasitic specific patterns to acquire predetermined accuracy in a predetermined scale range from a specific pattern. An example thereof is illustrated in FIGS. 9A and 9B. FIG. 9A illustrates an example in which two parasitic specific scales are used to correspond to a continuous scale of 70% to 130%. In the drawing, a black circle represents the scale of a specific pattern, white circles represent the scales of parasitic specific patterns, and dotted lines represent accuracy profiles of a specific pattern and parasitic specific patterns. In FIG. 9A, a specific pattern with a scale of 100% and parasitic specific patterns with scales of 70% and 130% are generated. The accuracy profiles of the three patterns do not overlap each other and the accuracy degrades greatly in the scales between the specific pattern and the parasitic specific patterns. FIG. 9B illustrates an example in which the number of parasitic specific patterns increases and parasitic specific patterns with scales of 85% and 115% are generated in addition to the patterns illustrated in FIG. 9A. A total of five patterns are prepared and the accuracy profiles of the patterns partially overlap each other and thus it is possible to have correspondence to the continuous scales of 70% to 130% with a predetermined accuracy or greater. In this way, even when the continuous scale correspondence is necessary, it is possible to determine the number of parasitic specific patterns necessary.

As for the discrete scale correspondence, necessary parasitic specific patterns may be determined in the same way as in the first embodiment, or neighboring discrete scales may be covered with one parasitic specific pattern by applying the method described in this embodiment.

Finally, for each specific pattern, necessary parasitic specific patterns are generated from the specific pattern and are stored in the storage unit 209, and then this flow ends.

Then, in S803, the specific pattern registering unit 204 of the image analyzing unit 203 extracts local feature points from the specific pattern and the parasitic specific patterns stored in the storage unit 209 for each type of the local feature quantities, and calculates the total number of local feature points. Since a scale-invariant and rotation-invariant local feature quantity does not require a parasitic specific pattern, the total number of local feature points is calculated from only the specific pattern. An inter-feature extraction ratio which is a ratio of the total number of local feature points extracted from only the scale-invariant and rotation-invariant local feature quantity to the total number of local feature points extracted from the rotation-invariant local feature quantity is calculated. The inter-feature extraction ratio is used to estimate the number of local feature points in a query image. The data acquired herein is stored in the storage unit 209. If there is no room for a calculation cost for calculating the number of local feature points, the total number of local feature points may be estimated from the number of specific patterns and the number of parasitic specific patterns.

Then, in S804, the specific pattern registering unit 204 of the image analyzing unit 203 acquires an average number of local feature points in a previous query image. The average number of local feature points of X times in the past is calculated using the information of the total number of local feature points of the query image stored in the storage unit 209 in S503 of the specific pattern detection flow illustrated in FIG. 5. Since this value is the average number of local feature points which are currently selected, the average number of local feature points which are not selected is also estimated using the inter-feature extraction ratio calculated in S803. If the detection phase has not been sufficiently performed yet and the average value has not been acquired, an initial value calculated in advance from general office documents can be used. If the local feature quantity is switched in a predetermined period, the average numbers of local feature points of all the types of local feature quantities may be calculated from measured values. Information on the calculated average number of local feature points of the query image is stored in the storage unit 209 for use in a flow to be described later.

Then, in S805, the specific pattern registering unit 204 of the image analyzing unit 203 calculates an estimated detection time (an estimated retrieval time) for each type of local feature quantity from the estimated local feature quantity extraction time G and the estimated matching time H of the query image. The estimated time can be calculated using Expression 4.

$$\text{Estimated detection time} = G + H \quad \text{(Expression 4)}$$

When the average extraction time of local feature points from the query image is defined by A, the average number of local feature points of the query image is defined by B, and the local feature quantity calculation time per point is defined by C, the estimated local feature quantity extraction time G of the query image is calculated using Expression 5.

$$G = A + B \times C \quad \text{(Expression 5)}$$

When the total number of local feature points of a specific pattern/parasitic specific pattern is defined by D, the local feature quantity matching time per local feature quantity pair is defined by E, and the average matching degree calculation time when a specific pattern is not detected is defined by F, the estimated matching time H is calculated using Expression 6.

$$H = D \times B \times E + F \quad \text{(Expression 6)}$$

Here, the average extraction time of local feature points from the query image A, the local feature quantity calculation time per point C, the local feature quantity matching time per local feature quantity pair E, and the average matching degree calculation time when a specific pattern is not detected F are values calculated in S801. The total number of local feature points of a specific pattern/parasitic specific pattern D is a value acquired in S803. The average number of local feature points of the query image B is a value acquired in S804.

Subsequently, in S806, the specific pattern registering unit 204 of the image analyzing unit 203 compares the estimated detection times calculated in S805. If the estimated detection time of the scale-invariant and rotation-invariant local feature quantity is shorter than the estimated detection time of the rotation-invariant local feature quantity, the process of S604 is performed. Otherwise, the process of S605 is performed.

Here, a case in which the process of S604 is performed and a case in which the process of S605 is performed will be described with reference to FIGS. 10 and 11. In FIG. 10, the use of the rotation-invariant local feature quantity corresponds to the scales but the estimated detection time thereof is shorter. In this way, if the detection time of the scale-invariant and rotation-invariant local feature quantity is estimated to be equal to or longer than the detection time of the rotation-invariant local feature quantity, the process of S605 is performed. In FIG. 11, in comparison with FIG. 10, the average number of local feature points of the query image B and the total number of local feature points of specific pattern/parasitic specific pattern D are different. The total number of local feature points of specific pattern/parasitic specific pattern D varies with variations in the number of registered specific patterns and the scale correspondence range. In this case, the use of the scale-invariant and rotation-invariant local feature quantity causes a shorter estimated detection time. In this way, if the detection time of the scale-invariant and rotation-invariant local feature quantity is estimated to be shorter than the detection time of the rotation-invariant local feature quantity, the process of S604 is performed.

S604 and S605 of FIG. 8 are the same as S604 and S605 of FIG. 6 and thus description thereof will not be repeated.

Through the above-mentioned flow, if the continuous scale correspondence is necessary and the use of the rotation-invariant local feature quantity causes a higher speed, the rotation-invariant local feature quantity can be used. Accordingly, it is possible to improve productivity of specific pattern detection according to more detailed situations.

A second difference of the second embodiment from the first embodiment is selecting a feature quantity to be used even when the average number of feature points extracted from the query image is changed by a predetermined threshold value or more as well as when the user registers a new specific pattern. The flow thereof will be described with reference to FIG. 12.

Figure 12:
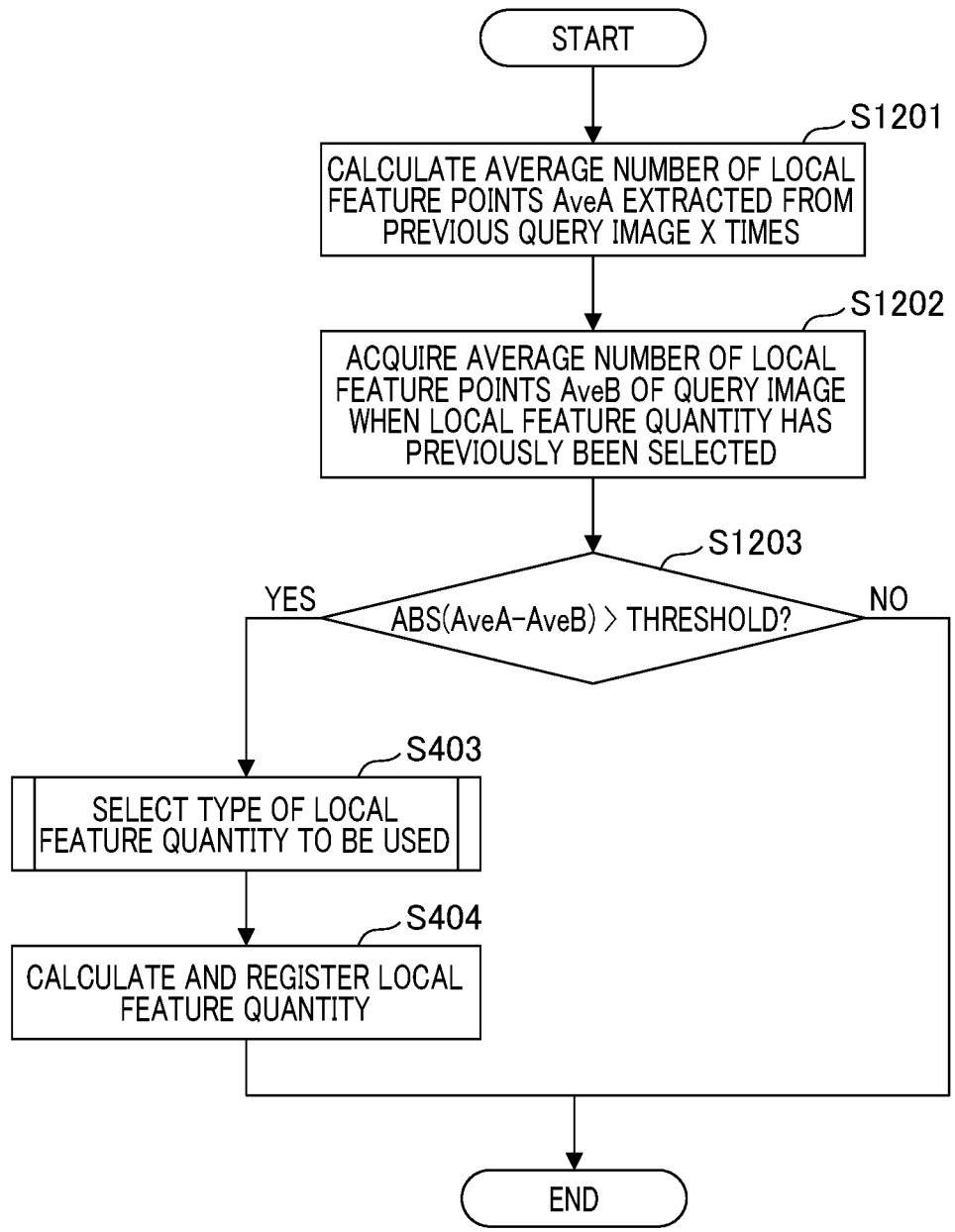
FIG. 12 is a diagram illustrating a flow following a variation of a query image.

FIG. 12 is a diagram illustrating a flow following a change of a query image. The flow illustrated in FIG. 12 is started whenever the specific pattern detecting process ends. The processes of the flow illustrated in FIG. 12 are performed by loading a program code stored in the storage unit 209 into the RAM 208 and causing the CPU 207 to execute the program code.

In S1201 of FIG. 12, the specific pattern registering unit 204 of the image analyzing unit 203 calculates the average number of local feature points AveA extracted from the query image X times in the past. The calculation method thereof is the same as in S804 of FIG. 8.

Then, in S1202, the specific pattern registering unit 204 of the image analyzing unit 203 acquires the average number of local feature points of the query image in selecting the local feature quantity when image search has previously been performed and sets the acquired average number as AveB. This value is the average number of local feature points of the local feature quantity which is currently selected and which is stored in the storage unit 209 in S804 of FIG. 8.

Subsequently, in S1203, the specific pattern registering unit 204 of the image analyzing unit 203 calculates ABS (AveA−AveB). Here, ABS(X) is a function for calculating the absolute value of X. If the absolute value ABS(AveA−AveB) of the difference is greater than a predetermined threshold value, the process of S403 is performed. The process of S403 is performed because characteristics of the query image which is used by the user have changed and the average number of local feature points of the query image (B) which is an estimation condition is expected to be changed. If the absolute value of the difference is not greater than the threshold value, the flow ends without performing any process.

Subsequently, the processes of S403 and S404 of FIG. 12 are the same as the processes of S403 and S404 of FIG. 4. In details of the process of S403, AveA calculated in S1201 is used as the average number of local feature points of the query image which is used in S804 of FIG. 8.

Through the above-mentioned flow, it is possible to re-calculate the estimated detection time when the estimation condition is changed, and it is possible to use an optimal local feature quantity to follow even change of the method used by the user.

As described above, in the specific pattern detecting method which is performed by the image retrieving device 200 according to this embodiment, the rotation-invariant local feature quantity can be used instead of the scale-invariant and rotation-invariant local feature quantity depending on various conditions even when the user requests the continuous scale correspondence. Accordingly, it is possible to achieve optimization of the detection time and to achieve improvement in productivity depending on the use conditions of the user. It is possible to switch the type of the local feature quantity without receiving registration of a new specific pattern from the user so as to conform to change in conditions.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image retrieving device capable of retrieving an image using a local feature quantity, the image retrieving device comprising:
   (a) a memory; and
   (b) a processor in communication with the memory, the processor being configured to perform operations comprising:
   (i) receiving a designation of a retrieval condition corresponding to a retrieval source image;
   (ii) determining whether or not to use a feature quantity of a local image having scale invariance on the basis of an estimated retrieval time that is estimated based on the retrieval condition; and
   (iii) performing control to calculate the feature quantity of the local image having scale invariance if it is determined to use the feature quantity of the local image having scale invariance, and performing control not to calculate the feature quantity of the local image having scale invariance if it is determined not to use the feature quantity of the local image having scale invariance.

2. The image retrieving device according to claim 1, wherein a designation of a scale correspondence range is received as the designation of the retrieval condition.

3. The image retrieving device according to claim 2, wherein, if it is determined not to use the feature quantity of the local image having scale invariance, a parasitic image is generated based on the scale correspondence range from the retrieval source image.

4. The image retrieving device according to claim 1, wherein the processor further performs an operation comprising (iv) detecting feature points from an image and calculating the feature quantity of the local image using pixels neighboring the feature points.

5. The image retrieving device according to claim 1, wherein the estimated retrieval time is estimated by calculating a retrieval time on the basis of the retrieval condition.

6. The image retrieving device according to claim 5, wherein the processor further performs operations comprising:
   (iv) calculating a first estimated retrieval time in a case when the feature quantity of the local image having scale invariance is used; and
   (v) calculating a second estimated retrieval time in a case when the feature quantity of the local image having scale invariance is not used,
   wherein it is determined to use the feature quantity of the local image having scale invariance in a case when the first estimated retrieval time is shorter than the second estimated retrieval time, and
   wherein it is determined not to use the feature quantity of the local image having scale invariance in a case when the first estimated retrieval time is not shorter than the second estimated retrieval time.

7. The image retrieving device according to claim 5, wherein the estimated retrieval time is calculated on the basis of at least one of the scale correspondence range corresponding to the retrieval source image, the number of retrieval source images, the number of parasitic images generated based on the scale correspondence range from the retrieval source images, and an average number of local feature points that is an average of the numbers of feature points in the retrieval target image.

8. The image retrieving device according to claim 7, wherein the processor further performs operations comprising:
   (iv) detecting feature points from an image and calculating local feature quantities of the feature points using pixels neighboring the feature points;
   (v) storing the numbers of feature points of the retrieval target image;
   (vi) calculating the average number of local feature points of the retrieval target image from the stored numbers of feature points of the retrieval target image; and
   (vii) storing the average number of local feature points of the retrieval target image.

9. The image retrieving device according to claim 8, wherein, if an absolute value of a difference between the latest average number of local feature points of the retrieval target image and the number of local feature points of the retrieval target image when image retrieval has previously been performed is greater than a threshold value, the latest average number of local feature points of the retrieval target image is used as the average number of local feature points of the retrieval target image for calculating the estimated retrieval time and the estimated retrieval time is calculated.

10. An image retrieving method comprising:
    receiving a designation of a retrieval condition corresponding to a retrieval source image;
    determining whether or not to use a feature quantity of a local image having scale invariance on the basis of an estimated retrieval time that is estimated based on the retrieval condition; and
    performing control to calculate the feature quantity of the local image having scale invariance if it is determined to use the feature quantity of the local image having scale invariance, and performing control not to calculate the feature quantity of the local image having scale invariance if it is determined not to use the feature quantity of the local image having scale invariance.

11. A non-transitory computer-readable recording medium having stored a program for causing a computer to execute a method, the method comprising:
    receiving a designation of a retrieval condition corresponding to a retrieval source image;
    determining whether or not to use a feature quantity of a local image having scale invariance on the basis of an estimated retrieval time that is estimated based on the retrieval condition; and
    performing control to calculate the feature quantity of the local image having scale invariance of it is determined to use the feature quantity of the local image having scale invariance, and performing control not to calculate the feature quantity of the local image having scale invariance if it is determined not to use the feature quantity of the local image having scale invariance.

* * * * *